United States Patent
Stefanik et al.

(10) Patent No.: US 9,294,730 B2
(45) Date of Patent: Mar. 22, 2016

(54) METHOD AND APPARATUS FOR DISTRIBUTING MERCHANT ADVERTISEMENTS

(75) Inventors: John R. Stefanik, Atlanta, GA (US); E-Lee Chang, Mableton, GA (US); Charles Patrick Bradley, Lawrenceville, GA (US); Tuck Seng Tan, Lithia Springs, GA (US); Darnell Clayton, Atlanta, GA (US); Madhur Khandelwal, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1528 days.

(21) Appl. No.: 12/235,154

(22) Filed: Sep. 22, 2008

(65) Prior Publication Data

US 2010/0076848 A1  Mar. 25, 2010

(51) Int. Cl.

| | |
|---|---|
| *H04N 7/173* | (2011.01) |
| *G06Q 30/02* | (2012.01) |
| *G06Q 30/06* | (2012.01) |
| *G06Q 40/04* | (2012.01) |
| *H04N 21/2547* | (2011.01) |
| *H04N 21/258* | (2011.01) |
| *H04N 21/2668* | (2011.01) |
| *H04N 21/643* | (2011.01) |
| *H04N 21/81* | (2011.01) |
| *H04L 29/08* | (2006.01) |

(52) U.S. Cl.
CPC ........... *H04N 7/17318* (2013.01); *G06Q 30/02* (2013.01); *G06Q 30/0261* (2013.01); *G06Q 30/0601* (2013.01); *G06Q 40/04* (2013.01); *H04L 67/20* (2013.01); *H04L 67/26* (2013.01); *H04L 67/306* (2013.01); *H04L 67/36* (2013.01); *H04N 21/2547* (2013.01); *H04N 21/25883* (2013.01); *H04N 21/2668* (2013.01); *H04N 21/64322* (2013.01); *H04N 21/812* (2013.01)

(58) Field of Classification Search
CPC ..................................................... G06Q 30/00
See application file for complete search history.

(56) References Cited

U.S. PATENT DOCUMENTS

| | | | |
|---|---|---|---|
| 6,698,020 B1 * | 2/2004 | Zigmond et al. ................ 725/34 |
| 6,718,551 B1 * | 4/2004 | Swix et al. ....................... 725/32 |
| 2002/0103698 A1 * | 8/2002 | Cantrell ........................... 705/14 |
| 2005/0044009 A1 * | 2/2005 | Stone et al. ..................... 705/26 |
| 2006/0184989 A1 * | 8/2006 | Slothouber ................... 725/110 |
| 2008/0027801 A1 | 1/2008 | Walter et al. |
| 2008/0060002 A1 | 3/2008 | Noll et al. |
| 2008/0066096 A1 | 3/2008 | Wollmershauser et al. |
| 2008/0114648 A1 | 5/2008 | Chen et al. |
| 2008/0301727 A1 * | 12/2008 | Cristofalo et al. ............. 725/35 |
| 2009/0112724 A1 * | 4/2009 | Joo ................................ 705/14 |

OTHER PUBLICATIONS

Google, "Advertising Programs—Google AdSense", 1 page, http://www.google.com/intl/en/ads/, web site last visited Sep. 18, 2008.

* cited by examiner

*Primary Examiner* — Eric Netzloff
(74) *Attorney, Agent, or Firm* — Guntin & Gust, PLC; Ralph Trementozzi

(57) ABSTRACT

A system that incorporates teachings of the present disclosure may include, for example, an Internet Protocol Television (IPTV) system having a controller to present a merchant a graphical user interface (GUI) for entering advertisement information, receive from the merchant advertisement information, generate an advertisement GUI for presenting the received advertisement information, identify a plurality of users of the IPTV system that demographically correlate to the advertisement information, and direct the advertisement GUI to one or more set-top boxes of the identified plurality of users. Other embodiments are disclosed.

25 Claims, 13 Drawing Sheets

500

METHOD AND APPARATUS FOR DISTRIBUTING MERCHANT ADVERTISEMENTS

FIELD OF THE DISCLOSURE

The present disclosure relates generally to techniques for distributing consumer classified advertisements and more specifically to a method and apparatus for distributing merchant advertisements.

BACKGROUND

Merchants generally advertise products or services by way of consumption media sources such as television media, radio, newspapers, magazines, targeted email distributions, webpages or portals. How successful merchants are in selling products or services can largely depend on how well the advertisement matches the interests of the targeted consumers.

DETAILED DESCRIPTION

One embodiment of the present disclosure entails an Internet Protocol Television (IPTV) system having a controller to present a merchant a graphical user interface (GUI) for entering advertisement information, receive from the merchant advertisement information, generate an advertisement GUI for presenting the received advertisement information, identify a plurality of users of the IPTV system that demographically correlate to the advertisement information, and direct the advertisement GUI to one or more set-top boxes (STBs) of the identified plurality of users.

Another embodiment of the present disclosure entails a network element of a media communication system having a controller to present a merchant a user interface (UI) for entering advertisement information, receive from the merchant the advertisement information, generate an advertisement UI for presenting the advertisement information, identify a plurality of users of the media communication system each having a profile that correlates to the advertisement information, present an offer to the merchant to demographically target users of the media communication system with the advertisement information, and direct the advertisement UI to one or more set-top boxes (STBs) of the plurality of users responsive to detecting an affirmative acceptance of the offer by the merchant.

Yet another embodiment of the present disclosure entails supplying advertisement information to an interactive television (iTV) system to target a subset of users of the iTV system having interests that correlate to the advertisement information.

Figure 1:
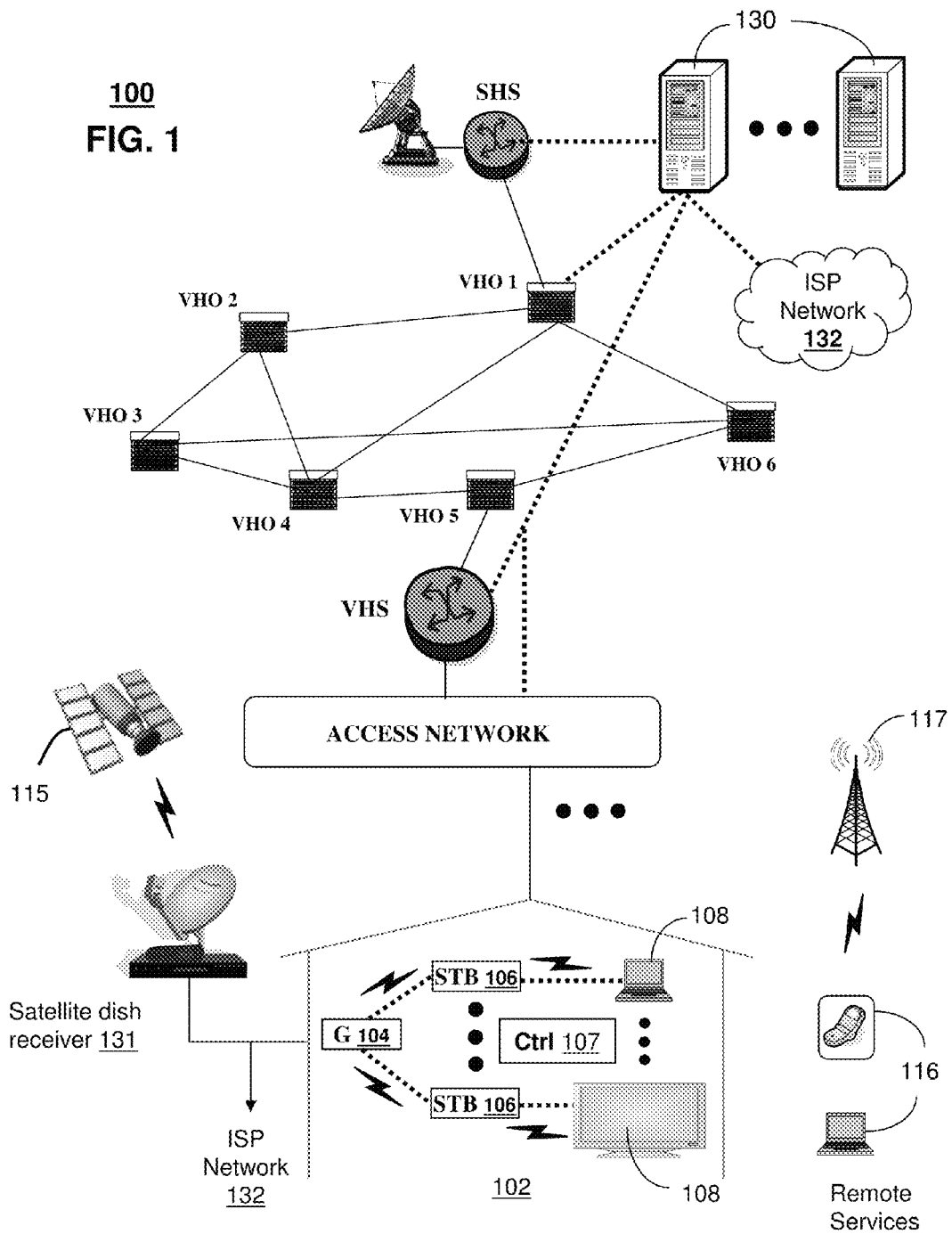
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as an internet-capable server which can operate independently of the web server mentioned above or can be an integral part thereof. The server, which will be referred to herein as server 130, can be used for developing user interfaces (UIs), and/or presenting UIs to presentation devices operably coupled to the first communication system 100. The UIs can represent graphical user interface (GUIs) for distributing merchant advertisements.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
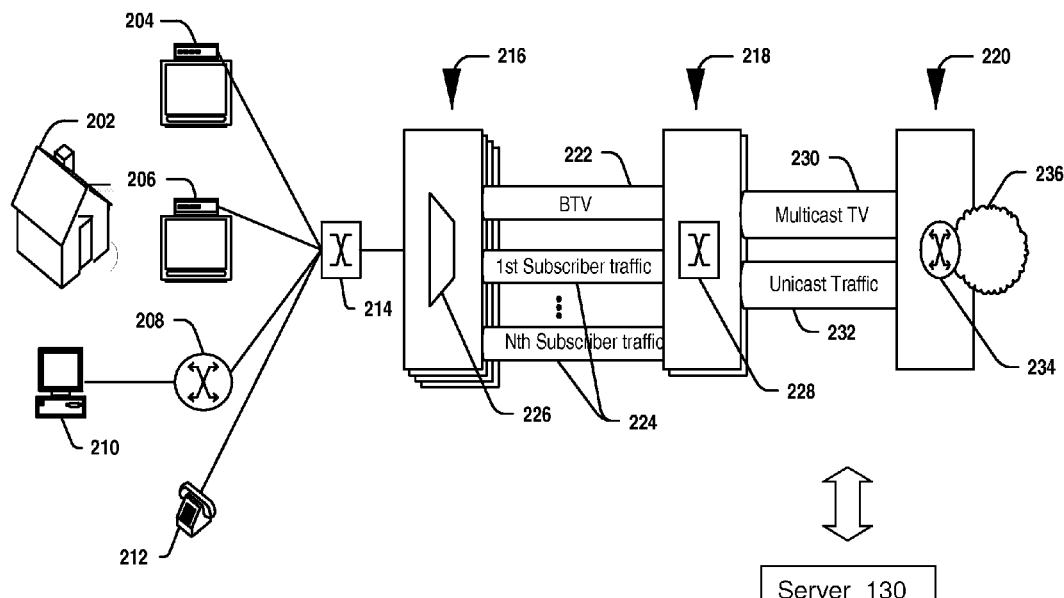

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The server 130 of FIG. 1 can be operably coupled to the second communication system 200 for purposes similar to those described above.

Figure 3:
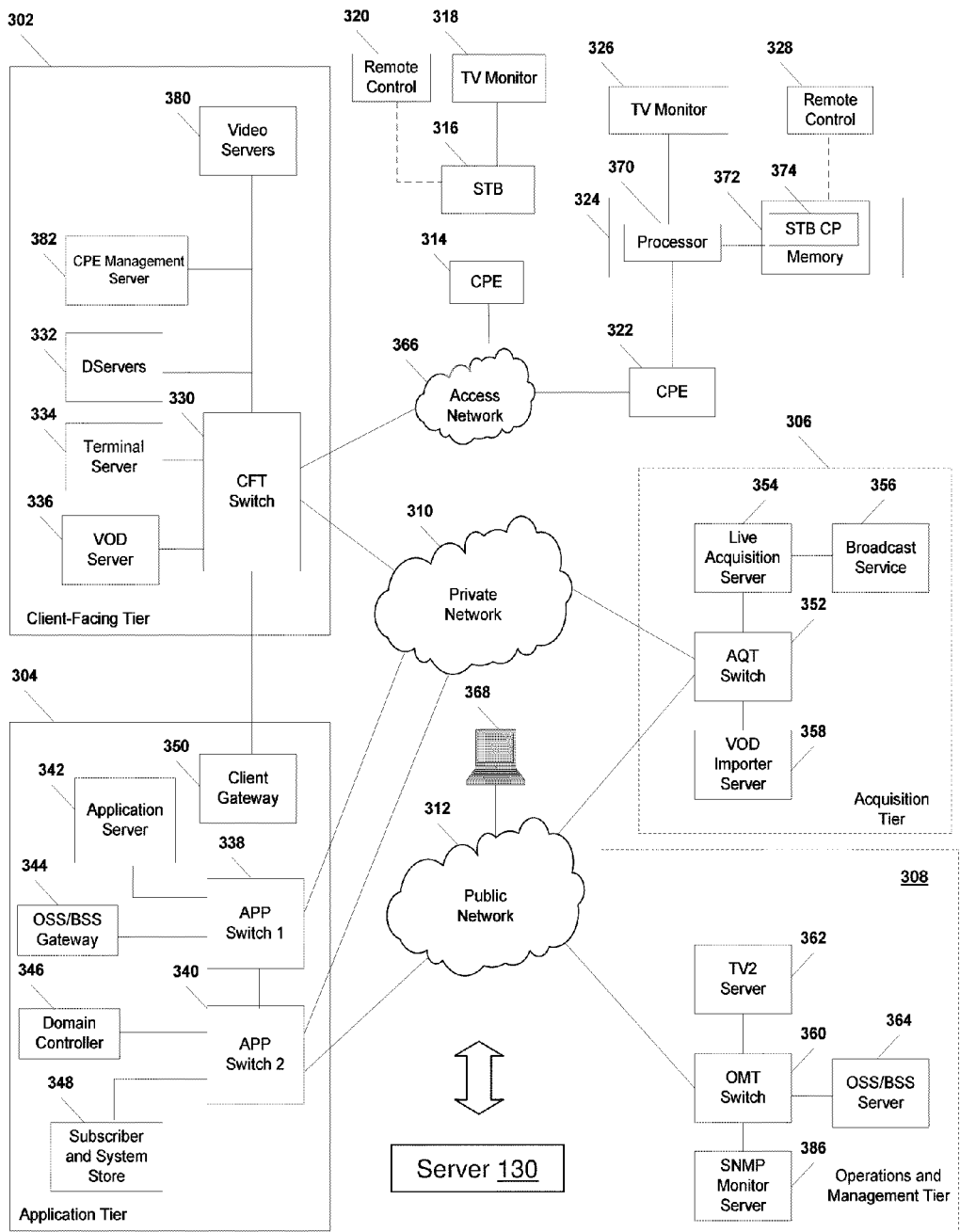

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The server 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
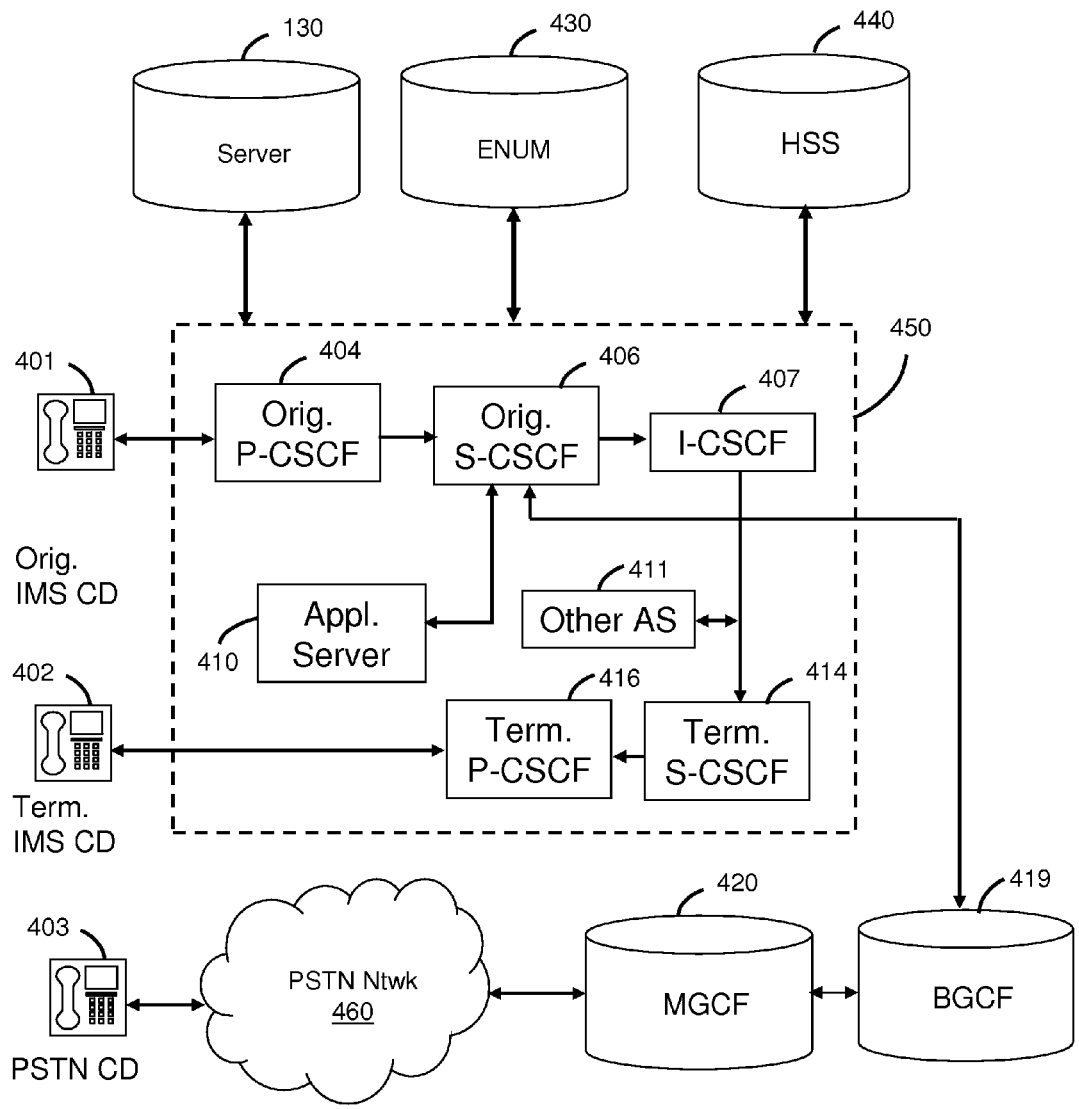

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the server 130 previously discussed for FIG. 1. In this representative embodiment, the server 130 can be accessed over a PSTN or VoIP channel of communication system 400 by common techniques such as described above.

Figure 5:
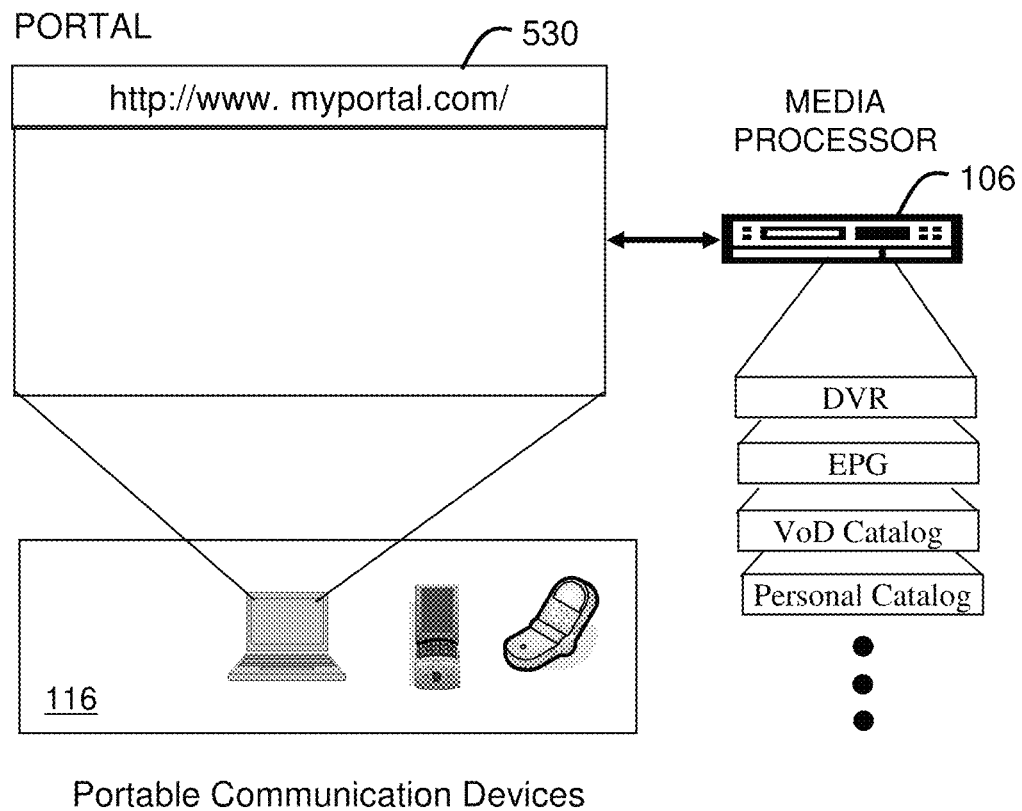
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
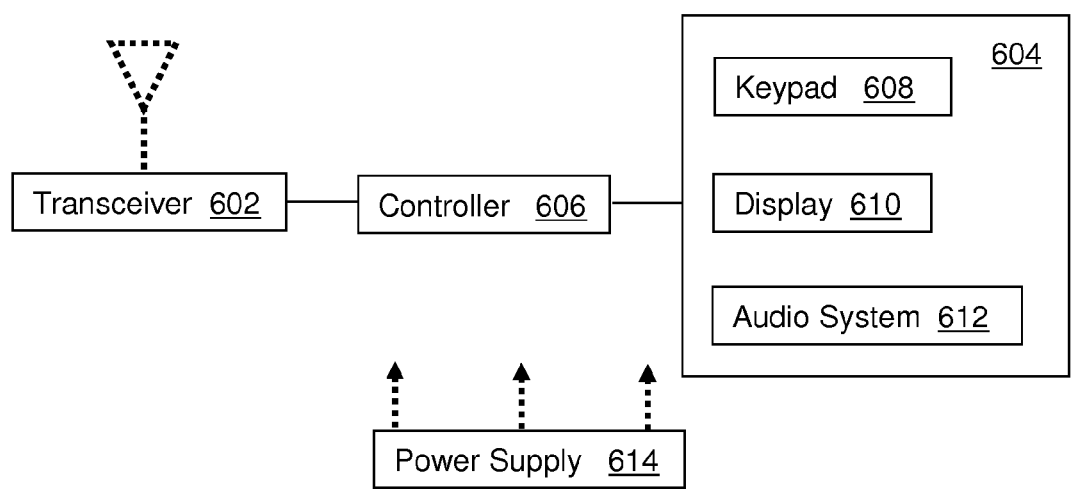
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alpha-numeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
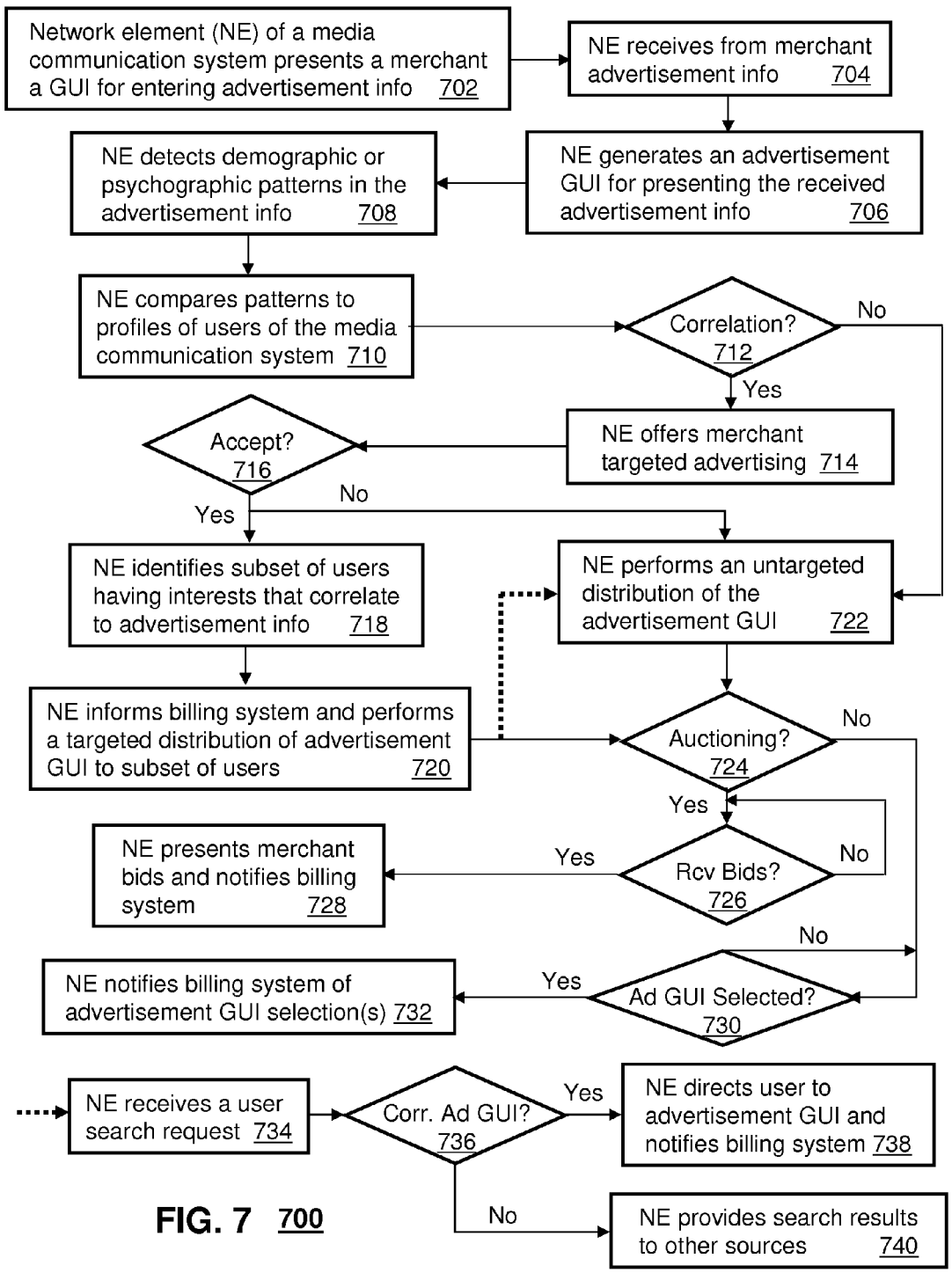
FIG. 7 depicts an illustrative embodiment of a method operating in portions of the communication systems of FIGS. 1-4.
Figure 8:
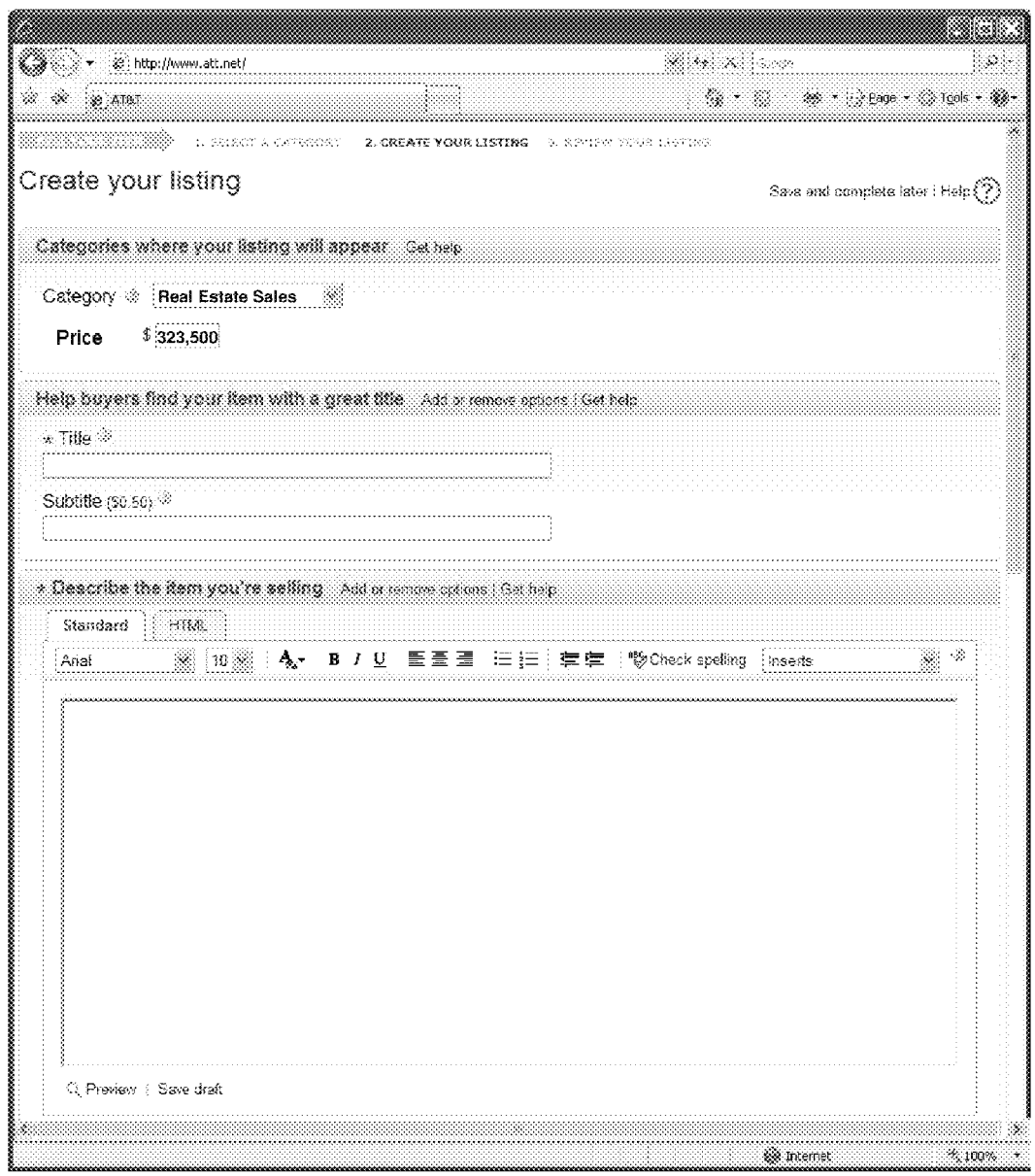
FIGS. 8-13 depict illustrative embodiments of the method of FIG. 7.
Figure 9:
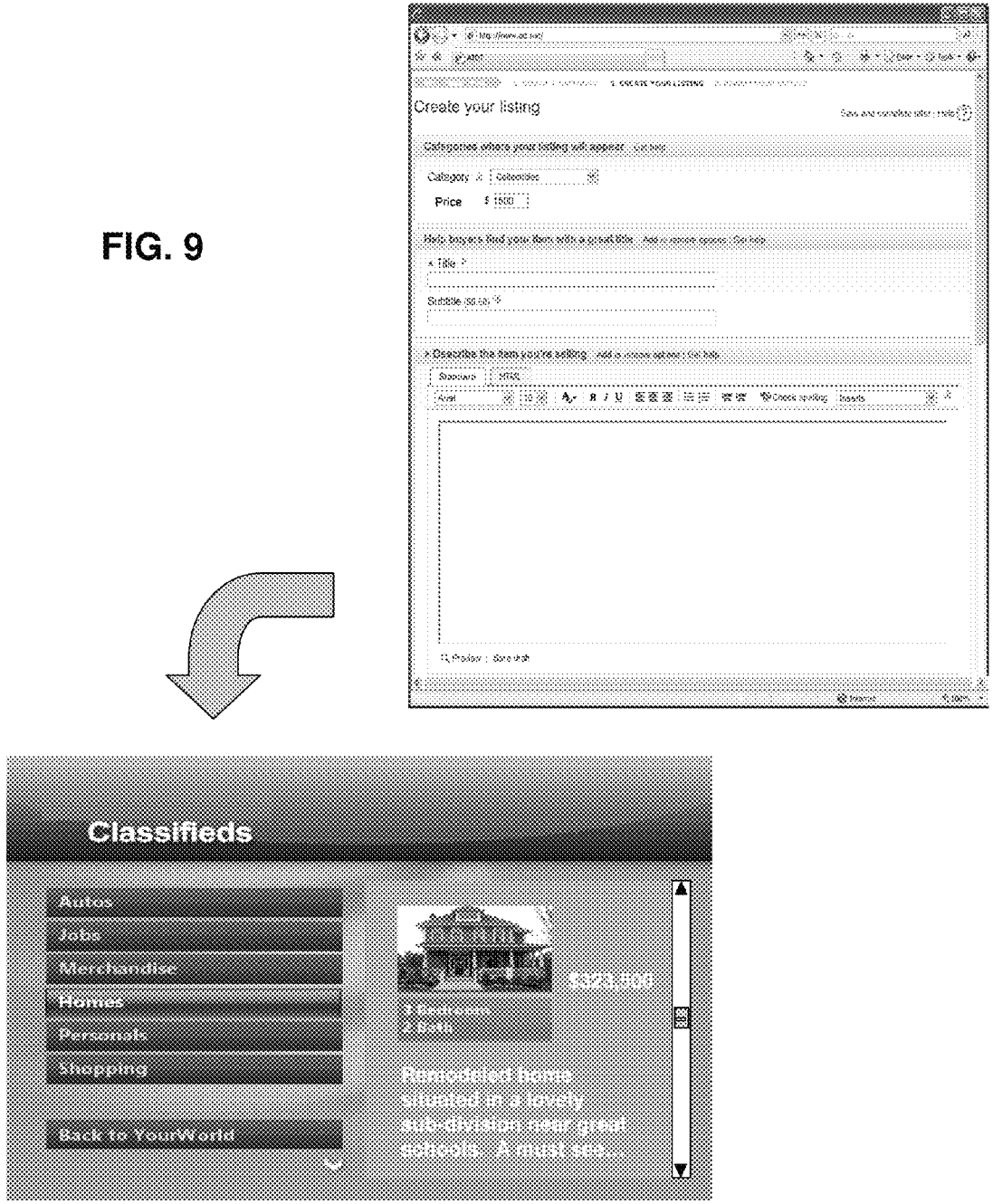

FIG. 7 depicts an illustrative method 700 operating in portions of communication systems 100-400. FIGS. 8-13 depicts illustrative embodiments of method 700. Method 700 can begin with step 702 in which a network element such as the server 130 of a media communication system like an interactive television system (iTV) described in FIGS. 1-3 and/or an IMS system described in FIG. 4 presents a merchant a graphical user interface (GUI) template such as shown in FIG. 8 for entering advertisement information.

The advertisement template can include a common HyperText Markup Language (HTML) editor which provides the merchant a means to enter advertisement information in any media format (e.g., audio content, moving image content, still image content or combinations), text, hypertext links to other webpages, metadata descriptive of the product or service sold and/or distributed, and combinations thereof. While entering content in the advertisement template, the merchant can select a preview button to preview the advertisement GUI that would be displayed to potential consumers—see FIG. 9. It will be appreciated that other present, next generation, or proprietary mark-up languages for editing GUIs (or user interfaces in general) can be applied to the present disclosure.

Upon receiving the merchant's advertisement information in step 704, the server 130 can generate an advertisement GUI in step 706 for presenting the advertisement information. The advertisement GUI can be a webpage, a GUI that is transferable between media presentation devices, or any other GUI presentation technique. In step 708, the server 130 can detect behavioral patterns in the advertisement information which it can use to perform targeted advertising. The behavioral patterns can represent for example demographic and/or a psychographic patterns detectable by common tools based on an analysis of the advertisement information supplied in the template by the merchant. The server 130 can compare the detected patterns in step 710 with user profiles generated by the media communication system. The user profiles can contain demographic and/or psychographic profiling information of each user of the media communication system.

Demographic profiling can be based on age, gender, income, size of household, occupation, education, value of residential property, location of residential property, media services rendered by the media communication system, fees paid therefor, and so on. The server 130 can use subscriber account information to generate a demographic profile for each user of the media communication system. Psychographic profiling can be determined by monitoring user consumption behavior of media services supplied by the media communication system by way of an STB or other consumption device (e.g., computer, cellular phone, game console, etc.). Consumption behavioral data can be used in turn to identify with common psychographic analysis tools user traits, user attitudes, user interests, user lifestyles, and other psychographic aspects of a user. An STB can be programmed to monitor consumption behavior, which it can be convey to the server 130 or some other network element for psychographic analysis.

In step 712 the server 130 can determine with common statistical tools whether a desirable correlation exists between the detected patterns of step 708 and the user profiles described above. If there is minimal or no correlation, the server 130 can proceed to step 722 where it distributes the advertisement GUI in an untargeted fashion to a general population of users of the media communication system. This step can represent a general distribution of the advertisement GUI to STBs operably coupled to the media communication system. A general distribution can represent a broadcast distribution of the advertisement GUI, or a passive distribution in which a presentation of the advertisement GUI occurs only after a proactive selection of the advertisement GUI is invoked by a user.

Figure 10:

For instance, suppose the merchant is a realty company desiring to distribute a home listing of one of its clients. Further suppose that the realty company has chosen untargeted advertising as its marketing approach. Under these circumstances, the server 130 can distribute the advertisement GUI (i.e., the home listing) from a "Classifieds" portal from which a real estate option ("Homes") can be selected such as shown in FIG. 10. From the "Classifieds" portal, a user of the media communication system must proactively select "Homes", enter search criteria, and if a match is detected, the advertisement GUI of the merchant is presented.

If a desirable correlation is detected in step 712, the server 130 can proceed to step 714 where it offers the merchant an option to choose targeted advertising to a subset of users of the media communication system that have a user profile that correlates to the advertisement information supplied by the merchant. If the merchant rejects the offer in step 716, the server 130 can proceed to step 722 where it performs an untargeted distribution of the advertisement GUI as described earlier. If the merchant accepts the offer, the server 130 can proceed to steps 718-720 where it identifies the subset of users having interests that correlate to the advertisement GUI, informs a billing system that the merchant has chosen targeted advertising (and submits a fee to the merchant for said service), and begins targeted distribution of the advertisement GUI to the identified subset of users.

Figure 11:
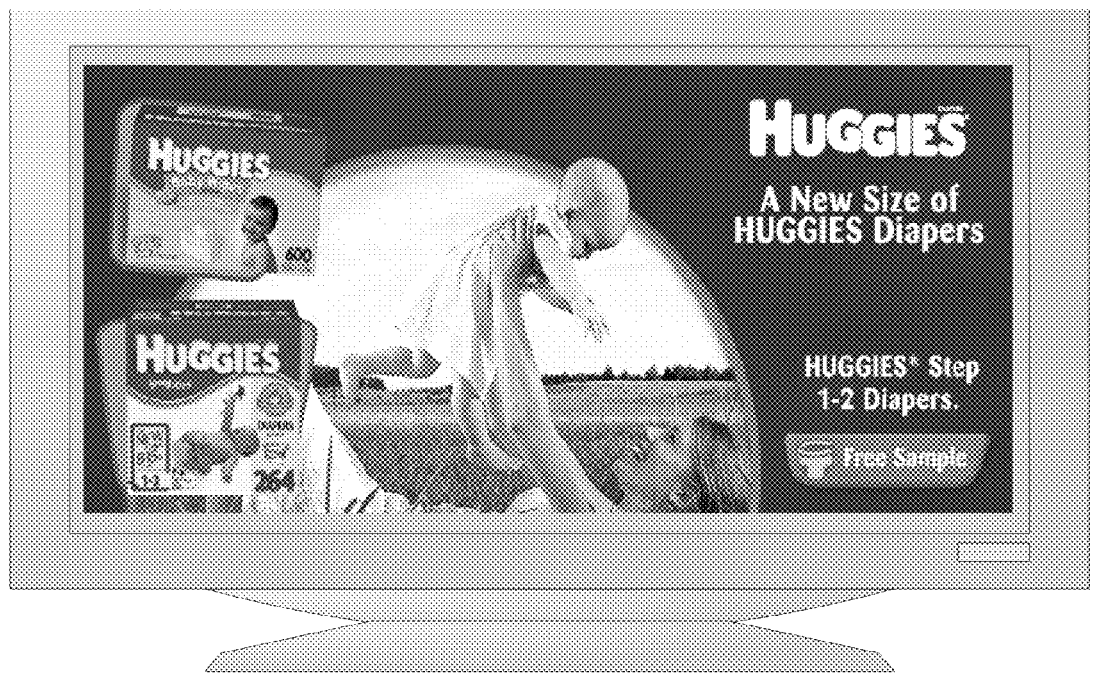

The targeted advertising can occur in any number of ways. For instance, the server 130 can direct one or more network elements of the media communication system to replace scheduled broadcast advertisements with targeted advertisements. In this illustrative embodiment, the subset of users can be presented on their STBs the advertisement GUI in place of other schedule advertisement. Suppose for instance that the advertisement involves baby hygiene products such as diapers. From demographic information known to the service provider of the media communication system, the server 130 can be directed to target users of the media communication system known to have young children in their home. The server 130 can manage one or more network elements of the media communication system so that the advertisement GUI of the merchant is presented to the identified subset of users during the schedule times of other broadcast advertisements. FIG. 11 illustrates a diaper commercial that can for example replace a broadcast commercial during its prescheduled time slot.

Figure 12:

FIG. 12 illustrates another advertisement GUI which a merchant may be promoting which can also replace a known time slot of another broadcast commercial. In this illustration, the advertisement GUI targets young children with an interest in animated movies. The server 130 can identify demographic profiles of users with a correlating demographic aspect to the merchant's advertisement GUI (e.g., parents with young children). The server 130 can further identify users having a psychographic profile that indicates this form of media content is desirable. With this information, the server 130 can identify a subset of users and perform targeted marketing of the merchant's advertisement as described above for steps 718-720.

It should be noted that even if a merchant chooses to accept targeted advertising, the server 130 can also be programmed to perform untargeted distributions of the advertisement GUI in order to expand the potential consumer base that can be reached by the merchant. This embodiment is shown by the dotted line from step 720 to step 722.

In step 724, the server 130 can also be programmed to conduct an auctioning process. The merchant can choose an auctioning process in steps 702-704 during the construction phase of the advertisement GUI. If an auctioning process has been chosen by the merchant, the server 130 can proceed to step 726 where it monitors the reception of bids from the users of the media communication system. If a bid is detected, the server 130 can proceed to step 728 where it presents the merchant one or more proposed bids, and notifies the billing system to charge the merchant for the auctioning service. The auctioning process can be interactive thereby allowing the merchant to accept a bid, or make counteroffer. The merchant can be charged a one-time fee for the auctioning feature, or can be charged for each detected bid exchange with users of the media communication system.

If auctioning is not enabled, the server 130 can proceed from step 724 to step 730 where it checks a selection of the advertisement GUI by users of the media communication system. If a selection is detected, the server 130 can notify the billing system in step 732 to charge the merchant for each selection (or click) of the advertisement GUI in a manner similar to the billing techniques used by portals today.

As a background process, the server 130 can also be programmed to monitor in step 734 search requests of users of the media communication system, and determine from said requests in step 736 whether the user is searching a product or service that correlates with the advertisement GUI of the merchant. If a desired correlation is found, the server 130 can direct the user initiating the request to the advertisement GUI and inform the billing system to charge the merchant for this form of targeted marketing. If a desired correlation is not detected, the user is supplied with the search results from other sources unrelated to the merchant.

Figure 13:
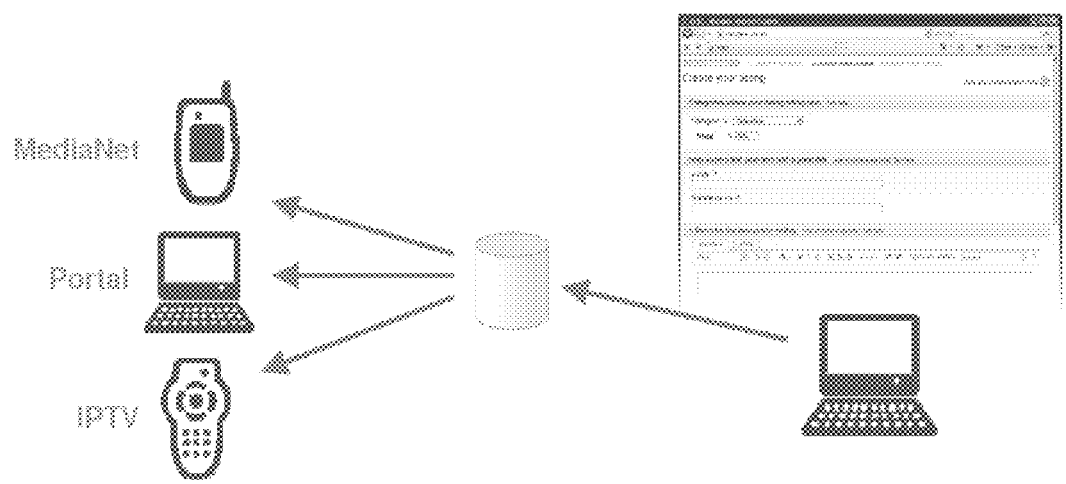

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that any form of merchant advertising is possible. For instance, method 700 can be applied to automobile sales, appliance sales, computer sales, and so on. Additionally, method 700 can be adapted to distribute as shown in FIG. 13 a merchant's advertisement GUI to any user's communication device operably coupled to the media communication system. Possible target communication devices can include without limitation STBs, DVRs, media players, gaming consoles, cellular phones, cordless phones, and so on.

Other suitable modifications can be applied to the present disclosure without departing from the scope of the claims below. Accordingly, the reader is directed to the claims section for a fuller understanding of the breadth and scope of the present disclosure.

Figure 14:
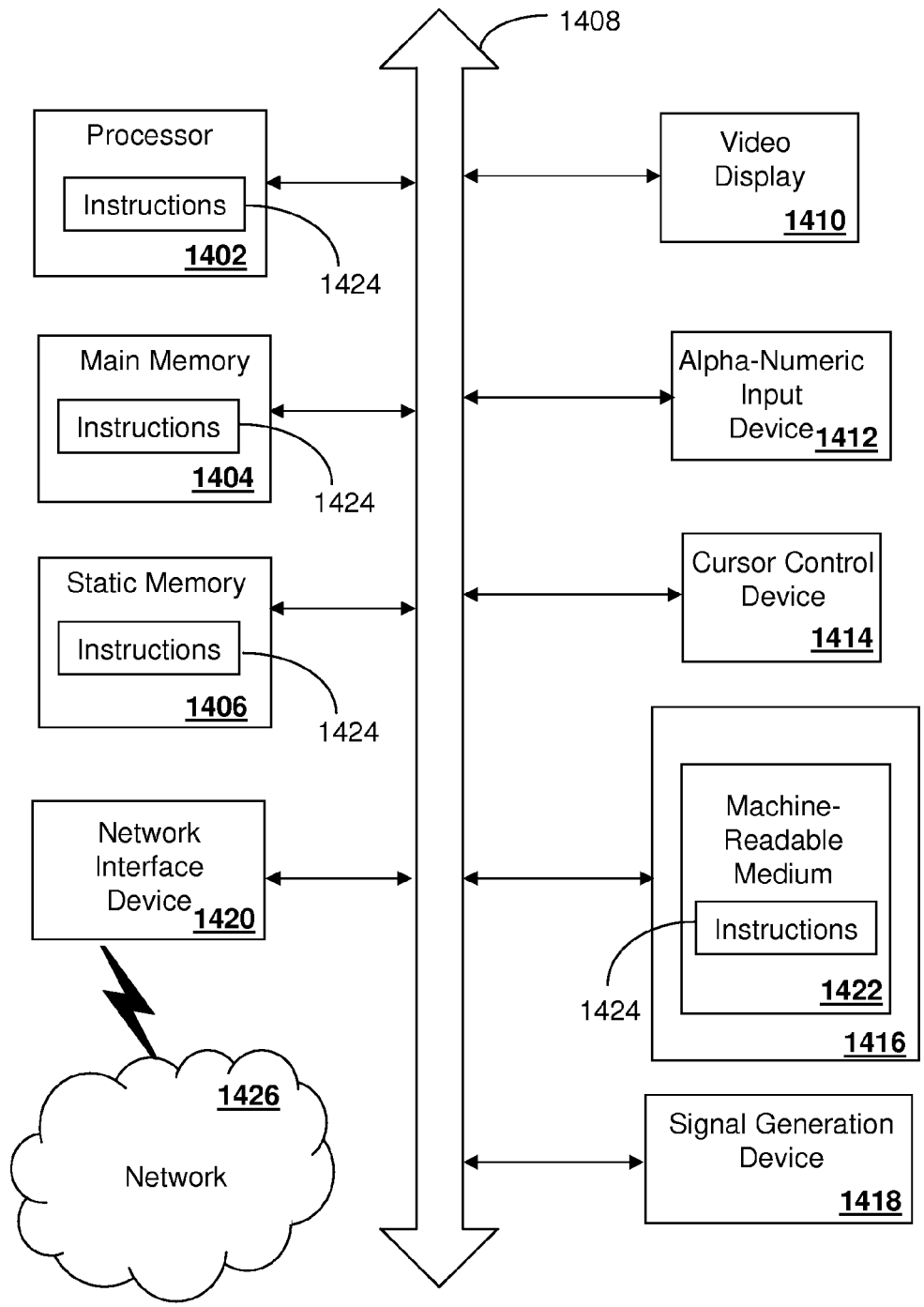
FIG. 14 is a diagrammatic representation of a machine in the form of a computer system within which a set of instructions, when executed, may cause the machine to perform any one or more of the methodologies discussed herein.

FIG. 14 depicts an exemplary diagrammatic representation of a machine in the form of a computer system 1400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, a solid state display, or a cathode ray tube (CRT)). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a machine-readable medium 1422 on which is stored one or more sets of instructions (e.g., software 1424) embodying any one or more of the methodologies or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1424, or that which receives and executes instructions 1424 from a propagated signal so that a device connected to a network environment 1426 can send or receive voice, video or data, and to communicate over the network 1426 using the instructions 1424. The instructions 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A television media communication system, comprising:
a memory storing computer instructions; and
a processor coupled with the memory, wherein the processor, responsive to executing the computer instructions performs operations comprising:
generating a merchant graphical user interface (GUI) template comprising a data entry field that accepts advertisement information from a merchant terminal for generating an advertisement GUI based on the advertisement information, and a selectable preview button that, when selected, provides a preview of the advertisement GUI, wherein the advertisement GUI comprises a selectable field based on the advertisement information that accepts an input from a plurality of users of the media communication system;
receiving from the merchant terminal the advertisement information;
generating the advertisement GUI based on the advertisement information;
identifying a behavioral pattern based on the advertisement information;
identifying the plurality of users associated with a corresponding plurality of user profiles, wherein the plurality of user profiles are determined based on user account information of the plurality of users;
comparing the behavioral pattern to the plurality of user profiles to determine one of a first correlation between the behavioral pattern and a subset of user profiles of the plurality of user profiles corresponding to a correlated subset of users of the plurality of users, or a lack of correlation between the behavioral pattern and the plurality of user profiles;
presenting, to the merchant terminal, an offer in response to the determining of the first correlation to initiate a targeted distribution of the advertisement GUI, wherein the targeted advertising is directed to the correlated user of users of the plurality of users;
directing the advertisement GUI to a first plurality of set-top boxes of the correlated subset of users in response to an acceptance of the offer, wherein the advertisement GUI replaces scheduled broadcast advertising during media programming;
directing the advertisement GUI to a second plurality of set-top boxes of the plurality of users in response to one of a rejection of the offer or the lack of correlation between the behavioral pattern and the plurality of user profiles;
monitoring the plurality of set-top boxes of the plurality of users for a search request from a target set-top box of the one of the first plurality of set-top boxes or the second plurality of set-top boxes for a product or service;
comparing the search request for the product or service to the advertisement information in the advertisement GUI previously directed to the target set-top box, to identify a second correlation between the search request and the advertisement information;
selectively providing the advertisement GUI to the target set-top box and notifying a billing system to charge a merchant account corresponding to the merchant terminal based on one of the second correlation between the search request and the advertisement information, or the acceptance of the offer; and
initiating the search request from other sources unrelated to the merchant account when the search request fails to correlate to the advertisement information.

2. The media communication system of claim 1, wherein the operations further comprise notifying a user of the plurality of users of the advertisement GUI.

3. The media communication system of claim 1, wherein the operations further comprise:
   presenting the offer to the merchant terminal to demographically target users of the media communication system with the advertisement information; and
   notifying the billing system responsive to detecting an affirmative acceptance of the offer received from the merchant terminal.

4. The media communication system of claim 1, wherein the operations further comprise:
   presenting an auctioning process for submitting bids for purchasing a good or a service presented in the advertisement GUI;
   receiving a bid from a set-top box of the plurality of set-top boxes of the plurality of users; and
   presenting the bid.

5. The media communication system of claim 4, wherein the operations further comprise presenting the bid from the set-top box of the user to the merchant terminal.

6. The media communication system of claim 1, wherein the operations further comprise identifying a user of the plurality of users according to a psychographic profile of the user of the plurality of users that correlate to the advertisement information.

7. The media communication system of claim 6, wherein the operations further comprise monitoring a consumption behavior of each user of the plurality of users and determining therefrom a profile selected from the group consisting of a demographic profile or a psychographic profile of each user of the plurality of users.

8. The media communication system of claim 1, wherein the operations further comprise:
   detecting a demographic pattern in the advertisement information; and
   identifying the plurality of users of the media communication system according to the demographic pattern.

9. The media communication system of claim 1, wherein the operations further comprise:
   distributing the advertisement GUI from a classifieds portal which enables selectable search criteria options for presenting the advertisement GUI of the merchant when a match with the selectable search criteria option is detected;
   detecting a selection of the advertisement GUI by a user of the plurality of users; and
   notifying a billing system responsive to detecting the selection of the advertisement GUI.

10. The media communication system of claim 9, wherein the billing system generates a fee directed to the merchant according to the selection of the advertisement GUI.

11. The media communication system of claim 7, wherein the demographic profile for each user is determined from age, gender, income, size of household, occupation, education, value of residential property, location of residential property, and fees paid for services rendered by the system.

12. The media communication system of claim 7, wherein the psychographic profile for each user comprises user traits, user attitudes, user interests, and user lifestyle determined from the consumption behavior.

13. A network element of a media communication system, comprising:
   a processor; and
   a memory that stores executable instructions that, when executed by the processor facilitate performance of operations comprising:
      presenting to a merchant terminal a user interface to receive entry of advertisement information and to obtain the advertisement information;
      receiving from the merchant terminal the advertisement information;
      generating an advertisement graphical user interface (GUI) to present the advertisement information, responsive to the receiving of the advertisement information, wherein the advertisement GUI comprises a selectable field based on the advertisement information that accepts an input from a plurality of users of the media communication system;
      identifying a behavioral pattern based on the advertisement information;
      identifying the plurality of users of the media communication system each user of the plurality of users having a respective profile of a plurality of user profiles determined from user account information;
      comparing the behavioral pattern to the plurality of user profiles to obtain one of a first correlation between the behavioral pattern and a subset of user profiles of the plurality of user profiles corresponding to a correlated subset of users of the plurality of users, or a lack of correlation between the behavioral pattern and the plurality of user profiles;
      presenting, in response to the first correlation, an offer to the merchant terminal to initiate a targeted distribution of the advertisement GUI to choose among targeted advertising to set-top boxes of a targeted plurality of users of the plurality of users of the media communication system having the respective profile that correlates to the advertisement information or untargeted distribution of the advertisement GUI;
      directing the advertisement GUI to a first plurality of set-top boxes of the targeted plurality of users responsive to detecting an affirmative acceptance of the offer by the merchant terminal, wherein the advertisement GUI replaces scheduled broadcast advertising during media programming;
      directing the advertisement GUI to a second plurality of set-top boxes of the plurality of users responsive to a failure to detect the affirmative acceptance of the offer by the merchant terminal;
      monitoring the first plurality of set-top boxes and the second plurality of set-top boxes for a search request from a target set-top box of the first plurality of set-top boxes and the second plurality of set-top boxes;
      comparing the search request to the advertisement information in the advertisement GUI previously directed to the target set-top box to identify a second correlation between the search request and the advertisement information;
      selectively providing the advertisement GUI to the target set-top box and notifying a billing system to charge a merchant account corresponding to the merchant terminal based on one of the second correlation or the affirmative acceptance of the offer; and
      initiating the search request from other sources unrelated to a merchant account corresponding to the merchant terminal when the search request fails to correlate to the advertisement information.

14. The network element of claim 13, wherein the media communication system supplies media content to its user by way of set-top boxes, wherein the media content is selected from the group consisting of: audio content; still image content; moving image content; and combinations thereof, and wherein the directing of the advertisement user interface to the set-top boxes responsive to detecting the affirmative acceptance of the offer enables the set-top boxes to replace scheduled broadcast advertising during media programming with the advertisement user interface.

15. The network element of claim 13, wherein the operations further comprise distributing the advertisement user interface by providing passive accessibility to the advertisement user interface by way of the set-top box of each of the plurality of users.

16. The network element of claim 13, wherein the operations further comprise distributing the advertisement user interface by notifying each set-top box of the plurality of users of a service or product offered in the advertisement user interface.

17. The network element of claim 13, wherein the operations further comprise distributing the advertisement user interface from a classifieds portal which enables selectable search criteria options for presenting the advertisement user interface of a merchant when a match with the selectable search criteria option is detected.

18. The network element of claim 13, wherein the operations further comprise:
presenting the plurality of users an auctioning process for submitting bids for purchasing a good or a service presented in the advertisement user interface;
receiving a bid from a user of the plurality of users; and
presenting the bid to the merchant.

19. The network element of claim 13, wherein the profile of each user of the plurality of users of the media communication system comprises a demographic profile and a psychographic profile.

20. The network element of claim 13, wherein the operations further comprise:
detecting a pattern selected from the group consisting of demographic patterns and psychographic patterns in the advertisement information; and
correlating the profile of each of the plurality of users of the media communication system to the pattern selected from the group consisting of demographic patterns and psychographic patterns.

21. The network element of claim 13, wherein the operations further comprise:
detecting a selection of the advertisement user interface at the set-top box of a user of the plurality of users; and
notifying a billing system responsive to detecting the selection of the advertisement user interface, wherein the billing system generates a fee directed to the merchant terminal.

22. The network element of claim 13, wherein the media communication system corresponds to a multimedia subsystem communication system, television communication system, a cable television communication system, a satellite television communication system, or combinations thereof.

23. The network element of claim 13, wherein the operations further comprise:
receiving from a set-top box of a user of the media communication system a search request for a product or service; and
presenting at the set-top box the advertisement user interface responsive to identifying a correlation between the search request for the product or service and the advertisement user interface.

24. A method, comprising:
generating, by a system comprising a processor, a merchant graphical user interface (GUI) template comprising a data entry field that accepts advertisement information from a merchant terminal for generating an advertisement GUI based on the advertisement information;
generating, by the system, the advertisement GUI to present advertisement information received from the merchant terminal to a plurality of set-top boxes, wherein the advertisement GUI comprises a selectable field based on the advertisement information that accepts an input from a plurality of users of an interactive television system;
identifying, by the system, a pattern based on advertisement information obtained by a merchant terminal;
comparing the pattern with a plurality of user profiles associated with the plurality of set-top boxes to determine one of a correlation of the pattern with a subset of user profiles of the plurality of user profiles or a lack of a correlation of the pattern with the plurality of user profiles;
presenting, by the system, responsive to the correlation of the pattern with the subset of user profiles, an offer at the merchant terminal to choose from among a group consisting of: initiating a targeted distribution of the advertisement GUI to targeted set-top boxes of the plurality of set-top boxes of the interactive television system; and initiating an untargeted distribution of the advertisement GUI to the plurality of set-top boxes;
responsive to a first choice received from the merchant terminal of the targeted advertising, supplying, by the system, the advertisement GUI to the interactive television system that replaces scheduled broadcast advertising during media programming to the targeted set-top boxes of a subset of users of the interactive television system having interests that correlate to the advertisement information;
responsive to a second choice received from the merchant terminal of the untargeted distribution of the advertisement GUI, supplying, by the system, the advertisement information to the plurality of set-top boxes;
receiving, by the system, from one of the plurality of set-top boxes a search request for a product or service;
determining, by the system, if the search request correlates to the product or service associated with the advertisement information previously supplied to the interactive television system for replacing scheduled broadcast advertising during media programming to the target set-top boxes of the subset of users;
selectively providing the advertisement GUI to the target set-top boxes and notifying a billing system to charge a merchant account corresponding to the merchant terminal based on the first and second choices;
initiating, by the system, the search request from a source associated with the advertisement information previously supplied to the interactive television system when the search request correlates to the advertisement information; and
initiating, by the system, the search request from other sources unrelated to the source associated with the advertisement information when the search request fails to correlate to the advertisement information.

25. The method of claim 24, wherein the interactive television system corresponds to an internet protocol television communication system, a cable television communication system, a satellite television communication system, or combinations thereof, wherein the interactive television system comprises one of a demographic profile, a psychographic profile or both for each of its users, wherein the interactive television system detects a correlation between the interests of the subset of users of the interactive television system and the advertisement information according to one of the profiles, wherein the interactive television distributes the advertisements information to a communication device of the subset of users, and wherein the communication device of each of the subset of users corresponds to one of a set-top box, a cellular phone, a game console, a media player, a computer, a personalized portal, a short-range mobility phone, or combinations thereof, wherein the search request is in the advertisement GUI.

\* \* \* \* \*